Figure 1:
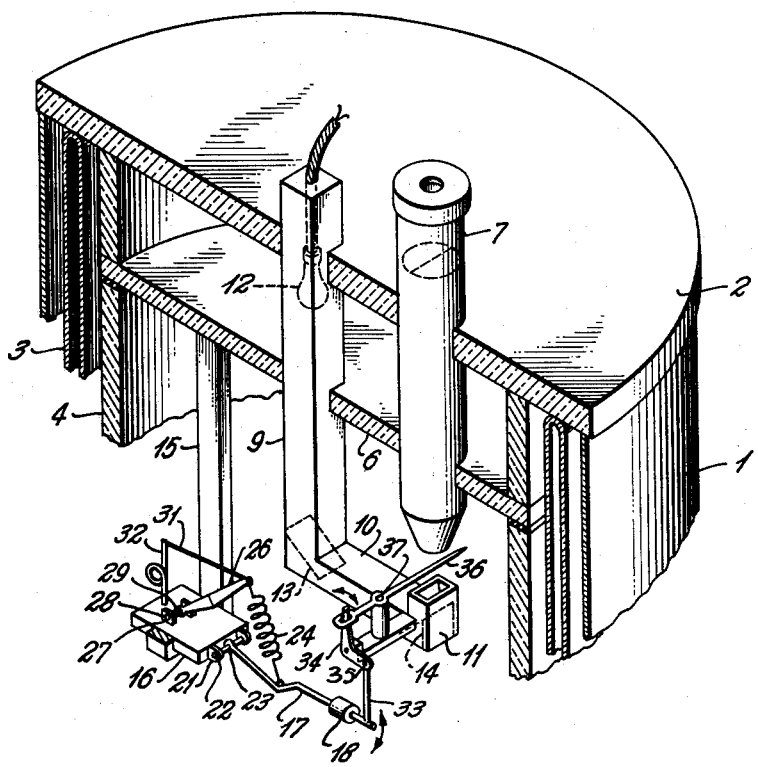

Feb. 5, 1963

B. M. BAKER 3,076,340

COMPENSATED GRAVITY MEASURING DEVICE

Filed Dec. 18, 1958

INVENTOR

*Buford M. Baker*

BY *Stevens, Davis, Miller & Mosher*

ATTORNEYS

3,076,340
COMPENSATED GRAVITY MEASURING DEVICE

Buford M. Baker, Houston, Tex., assignor to Texas Instruments Incorporated, Dallas, Tex., a corporation of Delaware
Filed Dec. 18, 1958, Ser. No. 781,268
6 Claims. (Cl. 73—382)

The present invention relates to gravity sensitive instruments and more particularly to a gravity sensitive instrument which is substantially insensitive to variations in ambient temperature.

The type of gravity measuring device with which the invention is particularly concerned comprises a gravity sensitive weight disposed at one end of an elongated arm which has its other end rotatably secured to a main support. The arm to which the gravity sensitive weight is secured is maintained in a generally horizontal position by a main spring which has one end secured directly or indirectly to the weight supporting arm and has its other end secured to one end of a second arm. The second arm has its other end pivotally secured to the main support of the instrument or some other fixed point in space. The second arm is supported in a predetermined position by a further plurality of springs which are connected either directly or indirectly to the second arm and these springs provide temperature compensation for the instrument.

The first mentioned arm on which the gravity sensitive weight or gravity mass is supported is moved up and down against the force of the main spring in accordance with the force of gravity at the particular location at which the instrument is disposed. A vane is attached to the weight supporting arm and is disposed in the optical path of a microscope or other optical instrument and the position of the vane in the field of view of the optical instrument is an indication of the position of the gravity sensitive weight and therefore of the force of gravity at the particular location. Variations in temperature produce serious effects in such an instrument and the two springs that support the second arm of the instrument are chosen to be of a different coefficient of expansion or temperature coefficient of resiliency from the main spring and are intended to compensate for changes in the resiliency of the main spring with temperature.

In a specific instrument with which the invention is concerned the weight, its supporting arm, the main spring and the second arm are all fabricated from quartz or more particularly fused quartz so as to eliminate the temperature sensitivity of the instrument. It is known that except for its temperature coefficient of elasticity, quartz is almost a perfect spring material, and in fact, except for this one sensitivity to temperature, it is superior to all other materials as a spring material. Quartz has a relatively low temperature coefficient of expansion and therefore variations in ambient temperature affect the instrument mainly by changes in the elasticity of the main spring.

In accordance with the prior art apparatus tungsten was employed as the material of the compensating springs since tungsten has a coefficient of expansion with temperature which is proportional numerically to the coefficient of elasticity of the quartz main spring. More particularly, upon an increase in temperature the stiffness of the main spring increases and therefore the spring tends to raise the weight supporting arm. However, since the second arm to which the upper end of the main spring is attached is supported by tungsten springs which have a positive temperature coefficient of expansion, the support arm moves downward and if all parameters are correctly chosen the downward movement of the end of the support arm exactly compensates or corrects for the increased stiffness of the main spring due to the increase in temperature and the weight supporting arm remains stationary.

In the system described above substantially complete temperature compensation can be effected, but several drawbacks are inherent in the apparatus. Specifically, it is difficult to make a permanent connection between tungsten and quartz and secondly, tungsten wire is not a homogeneous material and does not restore its dimensions upon variations in temperature. Therefore, the system must be repeatedly adjusted in order to insure correct compensation.

It is a primary object of the invention to provide a gravity sensitive instrument fabricated substantially from quartz.

It is another object of the invention to provide a quartz gravity meter which employs a gas to compensate for variations in elasticity of the quartz spring with temperature.

In accordance with the invention a gravity meter is provided which is fabricated substantially from quartz and in which all physical connections exist only between quartz members so as to eliminate the recurrent difficulties of attaching quartz to other materials. The apparatus is provided with a quartz arm for supporting a quartz weight and a quartz main spring for supporting the quartz arm. A second arm for supporting an upper end of the quartz main spring is provided and is also fabricated of quartz and has its end remote from the main spring, hinged to a quartz support as is the end of the weight supporting arm remote from the weight. The end of the second quartz arm to which the main spring is attached is also connected via a thin quartz rod or wire to one end of a hollow quartz tube having a single helical loop formed therein. The hollow helical loop of quartz material is filled with a gas under a predetermined pressure and the hollow member is sealed at both ends so as to retain the gas therein. All gases are substantially perfect spring material since they are not subject to hysteresis, creep or fatigue and in addition have a linear temperature coefficient of expansion.

As the ambient temperature of the medium surrounding the quartz gravity meter of the invention increases and the stiffness of the main spring increases, thereby tending to raise the weight supporting arm at the same time, the gas in the sealed quartz tube expands and tends to straighten out the loop formed therein. The hollow member is arranged such that the end to which the quartz wire, which extends to the upper end of the second support arm, is attached, moves toward the second support arm, moving the upper end of the main spring downwardly at the same time that the lower end of said spring tends to move upwardly. By appropriate design of the various elements of the apparatus, the downward movement of the upper end of the spring can be made to match exactly the tendency of the lower end of the spring to move upward and therefore the lower end of the spring and weight supporting arm attached thereto remains stationary in space and variations in position of the weight with temperature are substantially eliminated.

In consequence of the above arrangement, a gravity meter is provided in which all of the elements involved in direct sensing of gravity are fabricated from quartz and the only nonquartz material employed is the gas disposed within the hollow quartz tube. The system therefore eliminates the difficulty of attempting to attach quartz to any other material and further eliminates the difficulties encountered when using other materials, which difficulties result from creep, hysteresis, elastic deformation and fatigue inherent in all materials except gases.

It it therefore another object of the present invention to provide a temperature compensated gravity meter in which temperature variations in stiffness of a quartz spring are compensated for by utilizing the variations in pressure of a gas sealed within a quartz tube.

It is another object of the present invention to provide a gravity meter fabricated almost wholly from quartz material wherein variations in stiffness of a quartz spring with temperature are compensated for by variations in the pressure of a gas sealed within an arcuate quartz tube, which tube tends to straighten out as pressure of the gas increases with temperature.

Figure 2:
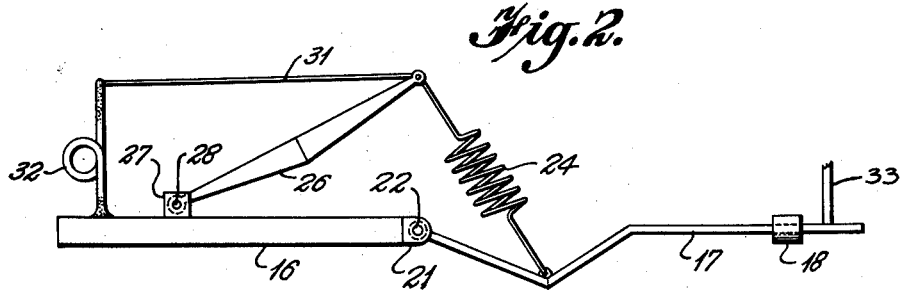

The above and still further objects, features and advantages of the present invention will become apparent upon consideration of the following detailed description of one specific embodiment thereof, especially when taken in conjunction with the accompanying drawing, wherein:

FIGURE 1 is a perspective view of a gravity meter fabricated in accordance with the present invention; and FIGURE 2 is a schematic mechanical diagram illustrating the principal mechanical members of the gravity sensitive mechanism.

Referring now specifically to FIGURE 1 of the accompanying drawing there is illustrated a gravity meter comprising an outer casing 1, having a cover 2 adapted to cover the upper end of the casing 1 and to be securely held thereon. Secured to the under surface of the cover 2 and depending downwardly therefrom is a Dewar or evacuated flask 3 in which the gravity sensitive portion of the apparatus is wholly disposed. An inner casing 4 also depends downwardly from and is secured to the under surface of the cover 2 and is disposed within the evacuated flask 3. The outer casing 1, the evacuated flask 3 and the inner casing 4 all constitute hollow cylindrical members as illustrated, although the specific configuration of these members is relatively unimportant to the apparatus. A plate 6 disposed below and parallel to the plate 2 is secured within the hollow inner shell 4 of the apparatus and the space between the cover 2 and the plate 6 may be filled with insulating material. Alternatively, this space may be filled with heat conductive material so as to form a heat sink.

A microscope tube 7 extends downwardly through the cover 2 and the plate 6 and is secured to these members. The lower end of the miscroscope tube 7 is disposed below the plate 6 and the upper end, which constitutes an eye piece, is disposed above the plate 2. In consequence, the interior of the shell 4 may be viewed through the microscope tube 7. Also extending downwardly through the cover 2 and the plate 6 is a hollow light tube 9 which has a horizontal arm 10 within the inner hollow portion of the cylinder 4, extending toward the microscope 7 and terminating in an upwardly directed housing 11 disposed immediately below the end of the microscope tube 7. A light bulb 12 is disposed within the hollow tube 9 and mirrors 13 and 14 direct the light from the bulb 12 toward the bottom of the microscope tube 7.

The gravity measuring apparatus of the invention is supported on a quartz plate 16 secured to a U-shaped frame member 15 that is in turn secured to the underside of the plate 6. The gravity measuring mechanism constitutes an arm 17 having a weight 18 secured to one end thereof, the other end of the arm 17 being pivotally secured to the quartz base 16. More particularly, two parallel arms 21 extend forwardly in a horizontal plane from the block 16 and pivotally support, by means of pivots 22, a quartz spindle 23. The left end of the arm 17 as viewed in FIGURE 1 is secured to the spindle 23. The arm 17 is of gull-wing configuration as a result of design consideration. A quartz spring 24 has its lower end secured to the arm 17 and its upper end secured to a right end, as viewed in FIGURE 1, of a second arm 26. The arm 26 is pivotally secured to the quartz plate 16 about an axis parallel to the pivotal axis of the arm 17. Specifically, the pivotal support for the arm 26 comprises vertically upstanding and parallel legs 27 carrying opposed pivots 28. A spindle 29 is supported on the pivots 28, and the left end of the arm 26, as viewed in FIGURE 1, is secured to the quartz spindle 29. The right end of the arm 26; that is, the end that is secured to the upper end of the quartz spring 24, also has attached thereto one end of a quartz wire or rod 31, the other end of which is secured to the upper end of a looped hollow quartz tube 32. The quartz tube 32 has its lower end secured to the quartz plate 16 and the loop is disposed in a plane which passes through the central axis of the arm 26 and the central axis of the spring 24 and the arm 17. More particularly, the arms 17 and 26, the spring 24, the rod 31 and the quartz loop 32 all have their center lines lying in a vertical plane parallel to the supporting member 15. The hollow quartz tube 32 is filled with a suitable gas under relatively high pressure for purposes to be described subsequently.

Secured to the arm 17 and extending upwardly therefrom is an arm 33 which is hinged to a crank 34 pivoted at 35. Crank 34 is also connected by a loose pivot to an indicator arm 36 which is pivoted as shown at 37. Arm 36 extends over the top of housing 11 of tube 9 and below the lower end of the microscope 7. The arm 36 therefore is disposed between the microscope tube 7 and its source of light and its relative position in the field of the microscope tube 7 is indicative of the gravity force to which the instrument is subjected. The specific means shown is mererly illustrative and may be modified or substituted for by any suitable structure.

The operation of the gravity meter insofar as the determination of the force of gravity is conventional, and operates upon the principle that since the weight 18 is subjected to the pull of gravity the position of the arm 17 relative to the horizontal is an indication of the force of gravity is that region. The force of gravity tends to rotate the arm 17 downwardly, this being resisted by the force of the spring 24. Obviously, as the force of gravity upon the weight 18 increases and decreases extension and contraction of the spring is effected, thereby permitting rotation of the arm 17 in the first instance clockwise and in the second instance counterclockwise. Since the indicator arm 33 is secured to the arm 17 it also rotates about the pivot of the arm 17 and the position of the arm 36 in the field of the telescope 7 is varied.

Instruments of this type are extremely delicate and are particularly sensitive to variations in temperature. It can be seen that any change in the length of the arms 17 and 26 and in the spring 24 and in the elasticity of the spring 24 or any other components in the gravity measuring mechanism effects a relatively large movement of the pointer 36. Therefore, it is necessary to isolate the instrument as much as possible from variations in temperature and also to render the instrument as insensitive to variations in temperature as humanly possible. The first result may be accomplished by the utilization of the evacuated flask 3 and the heat insulating material placed between the cover 2 and the plate 6. However, no arrangement can maintain 100% temperature stability and therefore the instrument itself must be fabricated from temperature insensitive material. In the past this has been accomplished by manufacturing as many of the elements as possible from quartz since quartz is substantially insensitive to temperature, particularly in relationship to changes in dimension. In accordance with prior apparatus, the various members including the spring 24 have been fabricated from quartz, but one difficulty arises and this is related to the fact that a quartz spring changes its stiffness with temperature.

The apparatus of the present invention is rendered substantially insensitive to variations in stiffness of the spring 24 with temperature by the utilization of the hollow tube 32 containing a gas under substantial pressure.

The gas within the hollow quartz tube 32 when subjected to an increase in temperature increases its pressure and therefore tends to cause the upper end of the tube to rotate clockwise, as seen in FIGURE 2; that is, to cause the looped tube to unbend. As a result, the upper end of the tube 32 moves toward the right or toward the upper end of the arm 26. An increase in temperature is known to increase the stiffness of a quartz spring and therefore when the spring 24 is subjected to an increase in temperature it tends to pull the arm 17 upward; that is, tends to cause the arm 17 to rotate counterclockwise about its pivot. However, as the stiffness of the spring 24 increases, the upper end of the looped quartz tube 32 moves toward the right and the upper end of the spring 24 is moved downwardly. By properly designing the structure the downward movement of the upper end of the arm 26 precisely offsets the tendency of the lower end of the spring 24 to move upwardly, and therefore the lower end of the spring does not move and the arm 17 remains stationary.

The quartz tube 32 is described and illustrated as having a loop formed therein. It is not intended to limit the scope of the invention to a looped tube since any tube having an arcuate segment formed therein will respond to increases in temperature by attempting to unbend and therefore may be employed in the present apparatus. Also, the principles of the invention are not restricted to utilization of the specific apparatus illustrated but are broadly applicable to gravity determining instruments employing a spring to resist the pull of gravity.

Although the invention has been described and illustrated in terms of one specific embodiment, it will be clear that variations of the general arrangement and of the details of construction which are specifically illustrated and described may be resorted to without departing from the true spirit and scope of the invention as defined in the appended claims.

What is claimed is:

1. A quartz temperature-compensating gravity measuring device comprising a quartz support, a quartz mass, a quartz arm having one end pivotally connected to said support for supporting said mass, a quartz spring having one end supportingly attached to said arm, a hollow quartz tube filled with gas under pressure and having an arcuate segment, one end of said tube being mounted upon said support and the other end of said tube being free in space, and a physical connection between the free end of said tube and the other end of said spring, said arcuate segment of said tube being positioned such that the free end thereof moves toward said spring upon an increase in temperature.

2. A gravity measuring device comprising a quartz support, a quartz weight, a quartz arm pivotally mounted at one end on said support and supporting said weight adjacent its other end, said arm lying in a generally horizontal plane, a quartz spring having one end secured to said arm and extending generally upwardly therefrom, a hollow quartz tube filled with a gas under pressure and having an arcuate segment, one end of said tube being mounted upon said support and the other end being free to move in space, and a physical connection between the free end of said tube and the other end of said spring, said arcuate segment of said tube being positioned such that the free end of said tube moves toward said spring upon an increase in temperature.

3. A quartz temperature-compensating gravity measuring device comprising a quartz support, a quartz mass, a first quartz arm having one end pivotally connected to said support and said mass secured thereto adjacent the other end thereof, a second quartz arm pivoted to said support about an axis parallel to the pivotal axis of said first arm, said second quartz arm extending above said first quartz arm, a quartz spring interconnecting said arms, a hollow quartz tube filled with a gas under pressure and having an arcuate segment, said hollow tube having one end secured to said support, a physical connection between the other end of said tube and said second arm, said arcuate segment of said tube being positioned such that the other end of said tube moves toward said spring upon an increase in temperature.

4. A quartz temperature-compensating gravity measuring device comprising a quartz support, a quartz mass, a first quartz arm having one end pivotally connected to said support and said mass secured thereto adjacent the other end thereof, a second quartz arm pivoted to said support about an axis parallel to the pivotal axis of said first arm, said second quartz arm extending above said first quartz arm, a quartz spring interconnecting said arms, a hollow quartz tube filled with a gas under pressure and having an open loop formed therein, said tube having one end secured to said support, a quartz wire interconnecting the other end of said tube and said second arm, said tube being positioned such that upon an increase in temperature the other end of said tube moves toward said spring.

5. A temperature-compensating gravity measuring instrument comprising a quartz support having a fixed pivot mounted thereon, a quartz mass, a quartz arm having said mass secured adjacent one end thereof and having its other end rotatable about said fixed pivot, a quartz spring having one end thereof secured to said arm and extending upwardly therefrom, and means connected to said spring for moving the spring in the direction toward said arm a distance substantially equal to the reduction of length of the spring resulting from an increase in temperature in said spring, said means including a gas-filled quartz tube mounted on said support and having two end portions and an intermediate portion, said intermediate portion having an arcuate configuration acting to vary the distance between said end portions in linear relation to the temperature to which said intermediate portion is subjected.

6. A temperature-compensating gravity measuring instrument as set forth in claim 5 wherein said intermediate portion of arcuate configuration is a loop.

References Cited in the file of this patent

UNITED STATES PATENTS

| | | |
|---|---|---|
| 2,027,875 | Odend'Hal | Jan. 14, 1936 |
| 2,081,950 | Nesbitt | June 1, 1937 |
| 2,279,261 | Crawford et al. | Apr. 7, 1942 |
| 2,674,887 | Worden | Apr. 13, 1954 |